United States Patent
Ahn et al.

(10) Patent No.: US 9,014,097 B2
(45) Date of Patent: Apr. 21, 2015

(54) METHOD FOR TRANSMITTING CONTROL INFORMATION AND DEVICE THEREFOR

(75) Inventors: Joonkui Ahn, Anyang-si (KR); Suckchel Yang, Anyang-si (KR); Mingyu Kim, Anyang-si (KR); Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 103 days.

(21) Appl. No.: 13/876,064

(22) PCT Filed: Oct. 6, 2011

(86) PCT No.: PCT/KR2011/007409
§ 371 (c)(1),
(2), (4) Date: Mar. 26, 2013

(87) PCT Pub. No.: WO2012/047038
PCT Pub. Date: Apr. 12, 2012

(65) Prior Publication Data
US 2013/0195063 A1    Aug. 1, 2013

Related U.S. Application Data

(60) Provisional application No. 61/391,082, filed on Oct. 8, 2010.

(51) Int. Cl.
*H04W 4/00* (2009.01)
*H04L 1/16* (2006.01)
(Continued)

(52) U.S. Cl.
CPC ......... *H04W 72/0413* (2013.01); *H04L 1/0031* (2013.01); *H04L 1/1607* (2013.01);
(Continued)

(58) Field of Classification Search
USPC .......................................... 370/328, 330, 334
See application file for complete search history.

(56) References Cited

U.S. PATENT DOCUMENTS

2009/0219897 A1*  9/2009  Pajukoski et al. ............. 370/336
2010/0054358 A1    3/2010  Ko et al.
(Continued)

FOREIGN PATENT DOCUMENTS

CN            101662833         3/2010

OTHER PUBLICATIONS

Huawei, "A/N Codebook Design for Carrier Aggregation using Format 2 and DFT-S-OFDM", R1-103886, 3GPP TSG RAN WG1 meeting #61bis, Jun. 2010, 4 pages.

(Continued)

*Primary Examiner* — Andrew Lee
(74) *Attorney, Agent, or Firm* — Lee, Hong, Degerman, Kang & Waimey

(57) ABSTRACT

A method for transmitting uplink control information and a corresponding device, where the method which include receiving at least one of one or more PDCCH signals and one or more PDSCH signals and generating entire received response information with respect to one or more PDCCH signals and one or more PDSCH signals. Multiple received response information are contained in entire received response information and generated per cell and per subframe. If being a subframe in which a plurality of transport blocks (TBs) are received in a cell, DTX (discontinuous transmission) state and all negative acknowledgement (NACK) state are mapped to same bit values for the cell and the subframe. If being a subframe in which only one TB is received in a cell, DTX state and all NACK state are mapped to different bit values for the cell and the subframe.

14 Claims, 10 Drawing Sheets

(51) Int. Cl.
*H04L 5/00* (2006.01)
*H04W 72/04* (2009.01)
*H04L 1/00* (2006.01)
*H04L 1/18* (2006.01)

(52) U.S. Cl.
CPC ............ *H04L1/1671* (2013.01); *H04L 1/1819* (2013.01); *H04L 1/1822* (2013.01); *H04L 1/1861* (2013.01); *H04L 5/0007* (2013.01); *H04L 5/0053* (2013.01); *H04L 5/0055* (2013.01)

(56) References Cited

U.S. PATENT DOCUMENTS

| | | | |
|---|---|---|---|
| 2012/0113827 A1* | 5/2012 | Yamada et al. | 370/252 |
| 2013/0021932 A1* | 1/2013 | Damnjanovic et al. | 370/252 |
| 2013/0100918 A1* | 4/2013 | Hong | 370/329 |
| 2013/0308550 A1* | 11/2013 | Yin et al. | 370/329 |
| 2013/0343312 A1* | 12/2013 | Lv et al. | 370/329 |
| 2014/0206341 A1* | 7/2014 | Siomina et al. | 455/422.1 |
| 2014/0254468 A1* | 9/2014 | Raaf et al. | 370/315 |

OTHER PUBLICATIONS

Huawei, "HARQ DTX within the agreed ACK/NACK Framework", R1-104499, 3GPP TSG RAN WG1 meeting #62, Aug. 2010, 7 pages.
Samsung, "UL HARQ-ACK Multiplexing: Mapping for 4 Bits", R1-104577, 3GPP TSG RAN WG1 #62, Aug. 2010, 3 pages.
LG Electronics, "Further details of ACK/NACK selection method", R1-104641, 3GPP TSG RAN WG1 #62, Aug. 2010, 8 pages.
PCT International Application No. PCT/KR2011/007409, Written Opinion of the International Searching Authority dated Mar. 19, 2012, 9 pages.
PCT International Application No. PCT/KR2011/007409, Written Opinion of the International Searching Authority dated Mar. 19, 2012, 16 pages.
The State Intellectual Property Office of the People's Republic of China Application Serial No. 201180048714.4, Office Action dated Jan. 7, 2015, 5 pages.

* cited by examiner

Reuse of LTE PUCCH format 2 (normal CP case)

METHOD FOR TRANSMITTING CONTROL INFORMATION AND DEVICE THEREFOR

CROSS-REFERENCE TO RELATED APPLICATIONS

This application is the National Stage filing under 35 U.S.C. 371 of International Application No. PCT/KR2011/007409, filed on Oct. 6, 2011, which claims the benefit of U.S. Provisional Application Ser. No. 61/391,082, filed on Oct. 8, 2010, the contents of which are all hereby incorporated by reference herein in their entirety.

FIELD OF THE INVENTION

The present invention relates to a wireless communication system, and more particularly to a method and apparatus for transmitting control information.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

DETAILED DESCRIPTION OF THE INVENTION

Technical Problem

An object of the present invention devised to solve the problem lies in a method and apparatus for efficiently transmitting control information in a wireless communication system. Another object of the present invention devised to solve the problem lies in a method and apparatus for efficiently transmitting uplink control information using a plurality of cells, and efficiently managing resources associated with the uplink control information. It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method of transmitting uplink control information at a communication apparatus configured with a plurality of cells in a wireless communication system, the method including: receiving at least one of one or more Physical Downlink Control Channel (PDCCH) signals and one or more Physical Downlink Shared Channel (PDSCH) signals through one or more subframes on the plurality of cells; and generating entire received response information of the one or more PDCCH signals and the one or more PDSCH signals, wherein multiple received response information contained in the entire received response information are generated per cell and per subframe, wherein, if there is a subframe in which a plurality of transport blocks (TBs) are received in a cell configured to support transmission of multiple transport blocks (TBs), DTX (discontinuous transmission) state and all negative acknowledgement (NACK) state are mapped to the same bit values for the cell and the subframe, and if there is a subframe in which only one transport block (TB) is received in a cell configured to support multiple transport blocks (TBs), DTX state and all NACK state are mapped to different bit values for the cell and the subframe.

The generating the received response information for a cell configured to support transmission of the multiple transport blocks (TBs) may include: mapping a received response state of the corresponding subframe to a bit value shown in the following table:

TABLE

| Bit value | In case of subframe in which only one TB is received | In case of subframe in which 2 TBs are received |
|---|---|---|
| A | DTX | DTX or NACK/NACK |
| B | NACK | NACK/ACK |
| C | ACK | ACK/NACK |
| D | — | ACK/ACK | where each of A, B, C and D indicates different two bit values.

A payload size of the entire received response information may be given according to the number of cells configured in the communication apparatus.

The method may further include: determining a physical uplink control channel (PUCCH) transmission power for transmission of the entire received response information, wherein the PUCCH transmission power is determined on the basis of the number of valid bits from among bits contained in the entire received response information.

The method may further include: determining a physical uplink control channel (PUCCH) transmission power for transmission of the entire received response information, wherein the PUCCH transmission power is determined on the basis of the number of activated cells from among the plurality of cells.

The entire received response information may include a plurality of per-cell received response information parts concatenated in increasing order of a cell index, and the each per-cell received response information part includes one or more received response information parts concatenated in order of a subframe index.

The method may further include: transmitting the entire received response information using PUCCH format 3.

In another aspect of the present invention, a communication apparatus configured to transmit uplink control information in a wireless communication system including a plurality of cells includes: a Radio Frequency (RF) unit; and a processor, wherein the processor is configured to receive at least one of one or more Physical Downlink Control Channel (PDCCH) signals and one or more Physical Downlink Shared Channel (PDSCH) signals through one or more subframes on the plurality of cells, and to generate entire received response information of the one or more PDCCH signals and the one or more PDSCH signals wherein multiple received response information contained in the entire received response information are generated per cell and per subframe. If there is a subframe in which a plurality of transport blocks (TBs) are received in a cell configured to support transmission of the multiple transport blocks (TBs), DTX (discontinuous transmission) state and all negative acknowledgement (NACK) state are mapped to the same bit values for the cell and the subframe, and if there is a subframe in which only one transport block (TB) is received in a cell configured to support multiple transport blocks (TBs), DTX state and all NACK state are mapped to different bit values for the cell and the subframe.

Effects of the Invention

As is apparent from the above description, exemplary embodiments of the present invention can efficiently transmit control information in a wireless communication system, efficiently transmitting uplink control information using a plurality of cells, and efficiently managing resources associated with the uplink control information.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by many wireless communication technologies, for example, Global System for Mobile communications (GSM), General Packet Radio Service (GPRS), Enhanced Data rates for GSM Evolution (EDGE), etc. OFDMA can be implemented by many wireless communication technologies, for example, IEEE 802.11 (Wi-Fi), IEEE 802.16 (WiMAX), IEEE 802.20, E-UTRA (Evolved UTRA), and the like. UTRA is a part of Universal Mobile Telecommunications System (UMTS). 3rd Generation Partnership Project (3GPP) Long Term Evolution (LTE) is a part of an Evolved UMTS (E-UMTS) that uses E-UTRA. The LTE—Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed for illustrative purposes only and the scope and spirit of the present invention is not limited thereto. Specific terms used in exemplary embodiments of the present invention are provided to aid in understanding of the present invention. These specific terms may be replaced with other terms within the scope and spirit of the present invention.

In a wireless communication system, a user equipment (UE) may receive information from a base station (BS) via a downlink, and may transmit information via an uplink. The information that is transmitted and received to and from the UE includes data and a variety of control information. A variety of physical channels are used according to categories of transmission (Tx) and reception (Rx) information of the UE.

Figure 1:
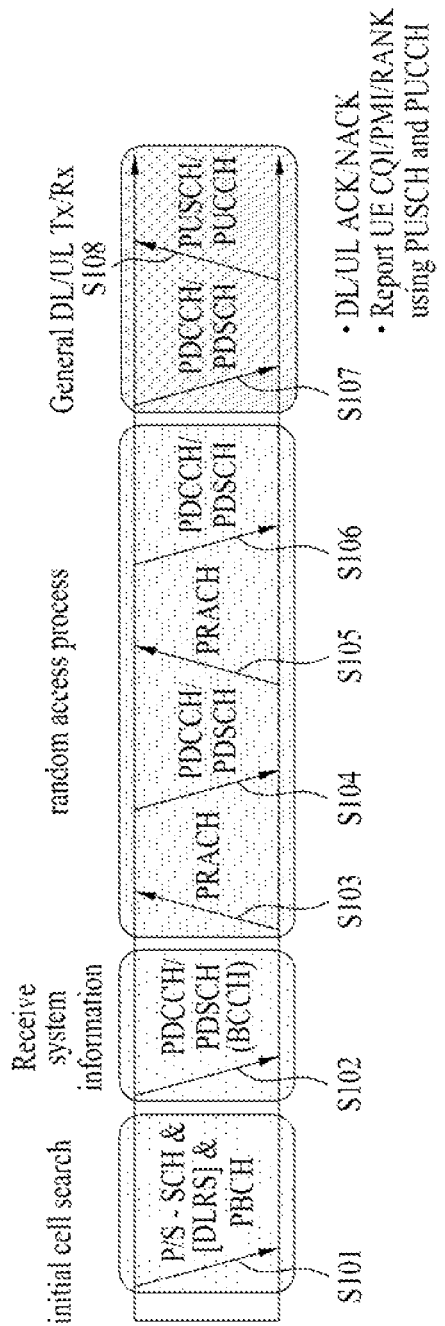
FIG. 1 is a conceptual diagram illustrating physical channels used in a 3GPP LTE system acting as an exemplary mobile communication system and a general method for transmitting a signal using the physical channels.

FIG. 1 is a conceptual diagram illustrating physical channels for use in a 3GPP system and a general method for transmitting a signal using the physical channels.

Referring to FIG. 1, when powered on from powered off or when entering a new cell, a UE performs initial cell search in step S101. The initial cell search involves synchronization with a BS. Specifically, the UE synchronizes with the BS and acquires a cell Identifier (ID) and other information by receiving a Primary Synchronization Channel (P-SCH) and a Secondary Synchronization Channel (S-SCH) from the BS. Then the UE may acquire information broadcast in the cell by receiving a Physical Broadcast Channel (PBCH) from the BS. During the initial cell search, the UE may monitor a downlink channel status by receiving a downlink Reference Signal (DL RS).

After initial cell search, the UE may acquire more specific system information by receiving a Physical Downlink Control Channel (PDCCH) and receiving a Physical Downlink Shared Channel (PDSCH) based on information of the PDCCH in step S102.

Thereafter, if the UE initially accesses the BS, it may perform random access to the BS in steps S103 to S106. For random access, the UE may transmit a preamble to the BS on a Physical Random Access Channel (PRACH) in step S103 and receive a response message for random access on a PDCCH and a PDSCH corresponding to the PDCCH in step S104. In the case of contention-based random access, the UE may transmit an additional PRACH in step S105, and receive a PDCCH and a PDSCH corresponding to the PDCCH in step S106 in such a manner that the UE can perform a contention resolution procedure.

After the above random access procedure, the UE may receive a PDCCH/PDSCH (S107) and transmit a Physical Uplink Shared Channel (PUSCH)/Physical Uplink Control Channel (PUCCH) (S108) in a general uplink/downlink signal transmission procedure. Control information that the UE transmits to the BS is referred to as uplink control information (UCI). The UCI includes a Hybrid Automatic Repeat and request Acknowledgment/Negative-ACK (HARQ ACK/NACK) signal, a Scheduling Request (SR), Channel Quality Indictor (CQI), a Precoding Matrix Index (PMI), and a Rank Indicator (RI). In the specification, HARQ ACK/NACK is simply referred to as HARQ-ACK or ACK/NACK (A/N). HARQ-ACK includes at least one of positive ACK (simply, ACK), negative ACK (NACK), DTX and NACK/DTX. The UCI is transmitted on a PUCCH, in general. However, the UCI can be transmitted on a PUSCH when control information and traffic data need to be transmitted simultaneously. Furthermore, the UCI can be aperiodically transmitted on a PUSCH at the request/instruction of a network.

Figure 2:
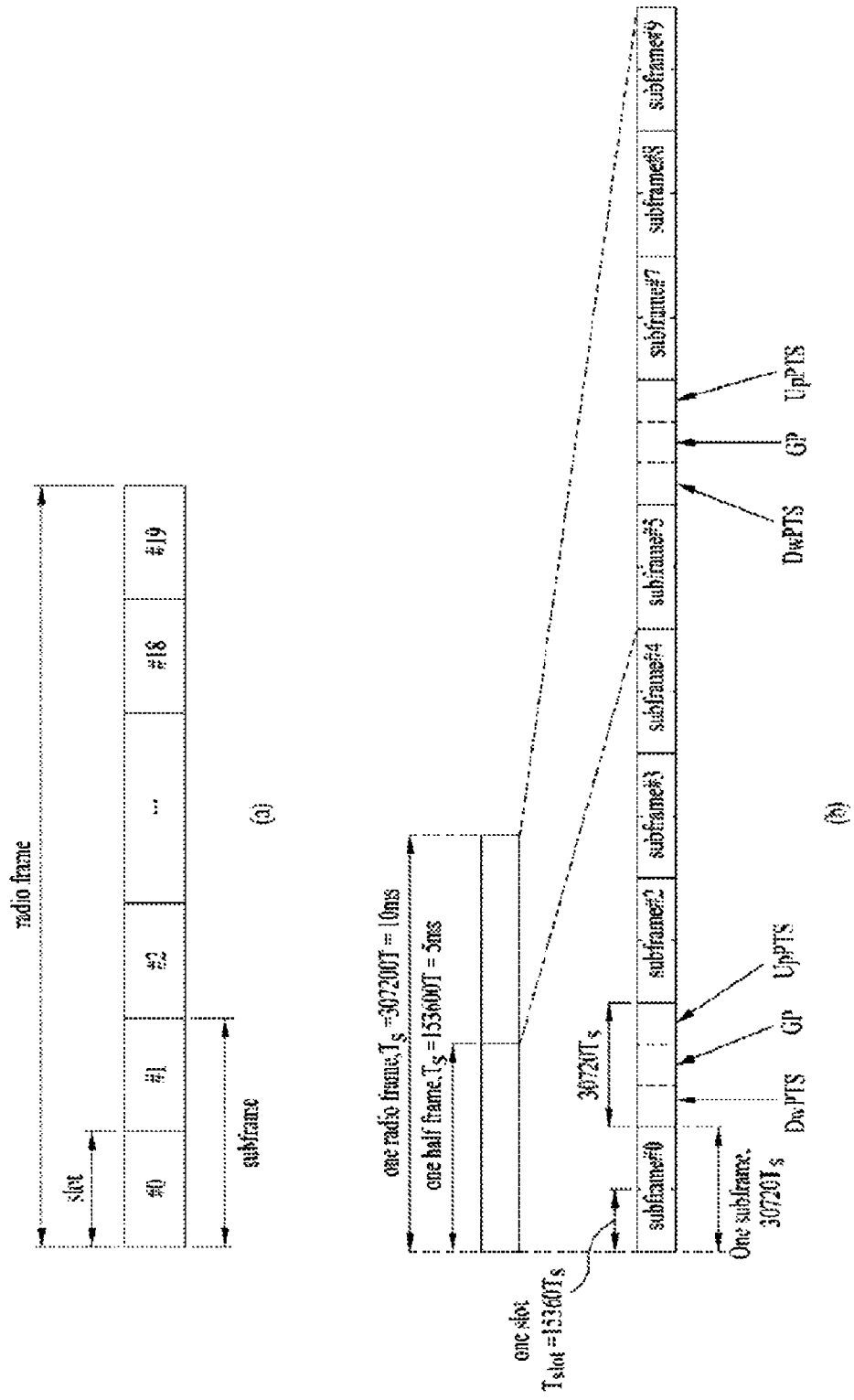
FIG. 2 is a diagram illustrating a structure of a radio frame.

FIG. 2 illustrates a radio frame structure. In a cellular OFDM wireless packet communication system, UL/DL data packet transmission is performed on a subframe basis. One subframe is defined as a predetermined interval including a plurality of OFDM symbols. 3GPP LTE supports a type-1 radio frame applicable to Frequency Division Duplex (FDD) and type-2 radio frame applicable to Time Division Duplex (TDD).

FIG. 2(a) illustrates a type-1 radio frame structure. A DL radio frame includes 10 subframes each having 2 slots in the time domain. A time required to transmit one subframe is referred to as Transmission Time Interval (TTI). For example, one subframe is 1 ms long and one slot is 0.5 ms long. One slot includes a plurality of OFDM symbols in the time domain and a plurality of Resource Blocks (RBs) in the frequency domain. Since 3GPP LTE systems use OFDMA in downlink, an OFDM symbol represents one symbol interval. The OFDM symbol can be called an SC-FDMA symbol or symbol interval. An RB as a resource allocation unit may include a plurality of consecutive subcarriers per slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. At most, the first three OFDM symbols in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes, a Downlink Pilot Time Slot (DwPTS), a Guard Period (GP), and an Uplink Pilot Time Slot (UpPTS), and one subframe consists of 2 slots. The DwPTS is used for initial cell search, synchronization or channel estimation. The UpPTS is used for channel estimation in a BS and UL transmission synchronization acquisition in a UE. The GP eliminates UL interference caused by multi-path delay of a DL signal between a UL and a DL.

TDD scheme divides the same frequency band into a DL subframe and a UL subframe within a time domain, and then uses the DL subframe and the UL subframe. For example, the ratio of a DL subframe to a UL subframe according to the TDD configuration may be set to M:1. M is the number of DL subframes corresponding to one UL subframe. Therefore, the UE must transmit an ACK/NACK response on a single UL subframe upon receiving a plurality of PDSCHs on M DL subframes.

The aforementioned structure of the radio frame is only exemplary, and various modifications can be made to the number of subframes contained in the radio frame or the number of slots contained in each subframe, or the number of OFDM symbols in each slot.

Figure 3:
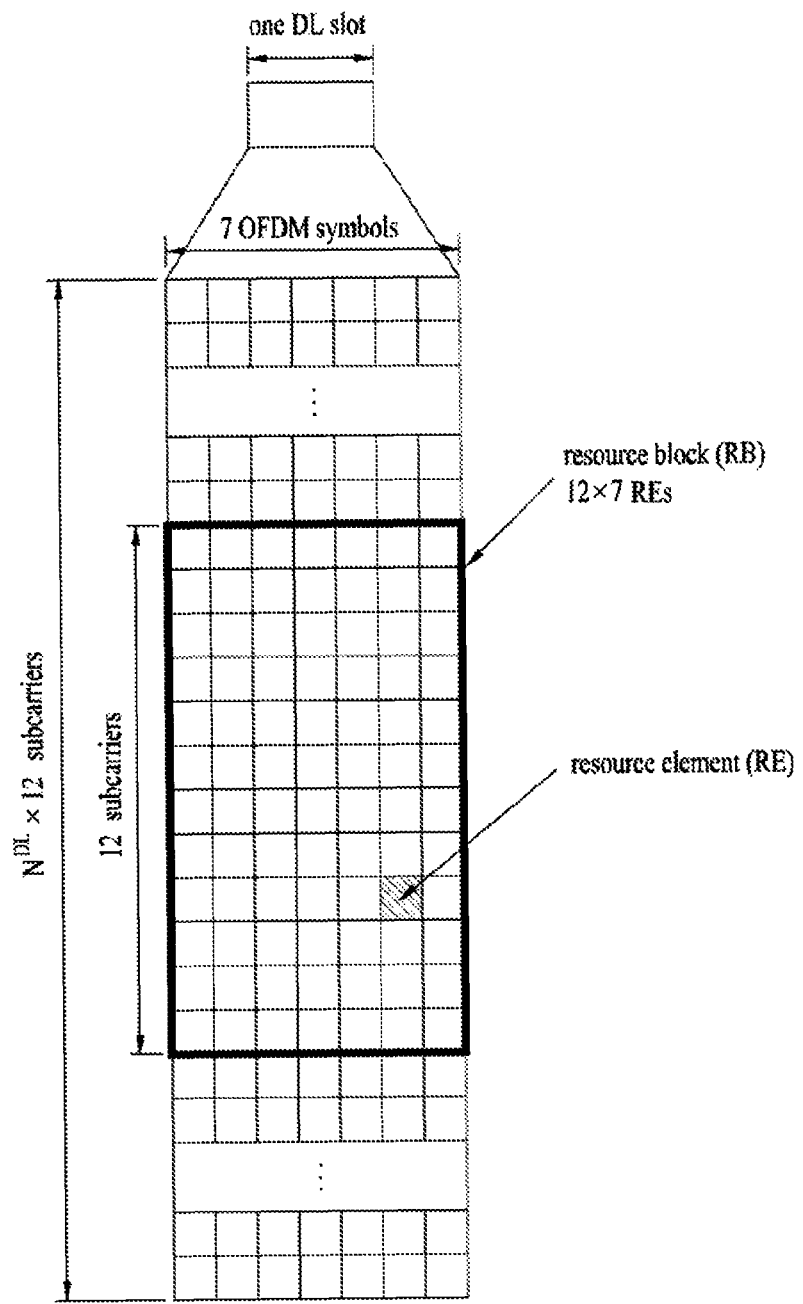
FIG. 3 exemplarily shows a resource grid of a downlink slot.

FIG. 3 exemplarily shows a resource grid of a downlink slot.

Referring to FIG. 3, a downlink slot includes a plurality of OFDM symbols in a time domain. One downlink slot includes 7 (or 6) OFDM symbols and a resource block (RB) includes 12 subcarriers in a frequency domain. Each element on a resource grid may be defined as a resource element (RE). One RB includes 12×7 (or 12×6) REs. The number ($N_{RB}$) of RBs contained in a downlink slot is dependent upon downlink transmission bandwidth. An uplink slot structure is identical to the downlink slot structure, but OFDM symbols are replaced with SC-FDMA symbols in the uplink slot structure differently from the downlink slot structure.

Figure 4:
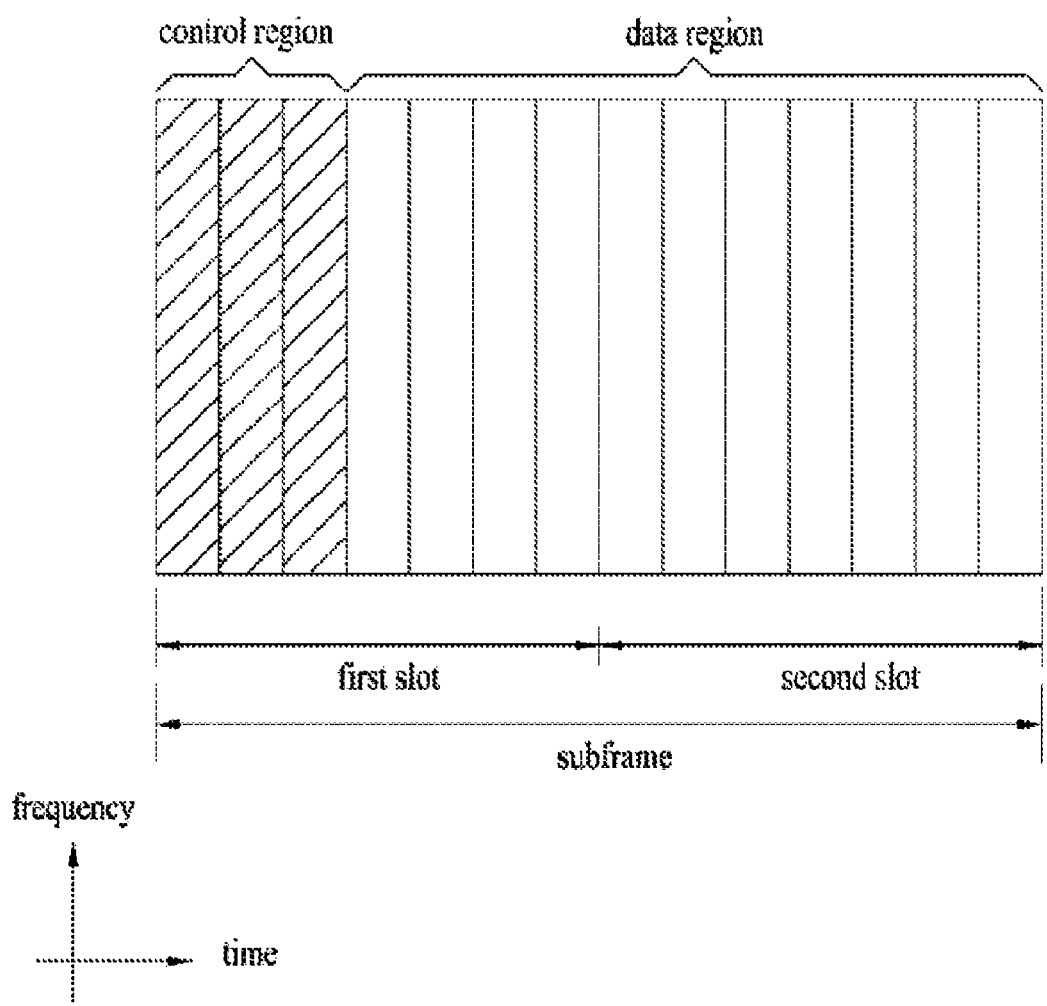
FIG. 4 illustrates a downlink frame structure.

FIG. 4 is a downlink subframe structure.

Referring to FIG. 4, a maximum of 3 (or 4) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE, for example, a Physical Control Format Indicator Channel (PCFICH), a Physical Downlink Control Channel (PDCCH), a Physical hybrid ARQ indicator Channel (PHICH), etc. PCFICH is transmitted from a first OFDM symbol of the subframe, and carries information about the number of OFDM symbols used to transmit a control channel within the subframe. PHICH carries a Hybrid Automatic Repeat request acknowledgment/negative-acknowledgment (HARQ ACK/NACK) signal as a response to an uplink transmission signal.

Control information transmitted over a PDCCH is referred to as Downlink Control Information (DCI). A variety of DCI formats are defined, for example, format 0 for uplink, and formats 1, 1A, 1B, 1C, 1D, 2, 2A, 3, 3A, etc. for downlink. DCI format may selectively include a variety of information according to various usages. For example, DCI format may selectively include a hopping flag, RB allocation, modulation coding scheme (MCS), redundancy version (RV), new data indicator (NDI), transmit power control (TPC), cyclic shift demodulation reference signal (CS DM RS), channel quality information (CQI) request, HARQ process number, transmitted precoding matrix indicator (TPMI), precoding matrix indicator (PMI) confirmation, etc. Transmission modes and DCI format contents to construct the multi-antenna technology are as follows.

Transmission Mode

Transmission Mode 1: Transmission from a single base station antenna port
Transmission Mode 2: Transmit diversity
Transmission Mode 3: Open-loop spatial multiplexing
Transmission Mode 4: Closed-loop spatial multiplexing
Transmission Mode 5: Multi-user MIMO
Transmission Mode 6: Closed-loop rank-1 precoding
Transmission Mode 7: Transmission using UE-specific reference signals DCI Format Format 0: Resource grants for PUSCH transmissions (uplink)
Format 1: Resource assignments for single codeword PDSCH transmissions (transmission modes 1, 2 and 7)

Format 1A: Compact signaling of resource assignments for single codeword PDSCH (all modes)
Format 1B: Compact resource assignments for PDSCH using rank-1 closed loop precoding (mode 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments PDCCH carries a variety of information, for example, transmission format and resource allocation information of a downlink shared channel (DL-SCH), transmission format and resource allocation information of an uplink shared channel (UL-SCH), paging information transmitted over a paging channel (PCH), system information transmitted over DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A user equipment (UE) can monitor a plurality of PDCCHs. PDCCH is transmitted as an aggregate of one or more contiguous control channel elements (CCEs). CCE is a logical allocation unit that is used to provide a coding rate based on a radio channel state to a PDCCH. CCE may correspond to a plurality of resource element groups (REGs). The format of PDCCH and the number of PDCCH bits may be determined according to the number of CCEs. A base station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, an identifier of the corresponding UE (e.g., cell-RNTI (C-RNTI)) may be masked with the CRC. If PDCCH is provided for a paging message, a paging identifier (e.g., paging-RNTI (P-RNTI)) may be masked with a CRC. If PDCCH is provided for system information (e.g., a system information block (SIC)), system information RNTI (SI-RNTI) may be masked with CRC. If PDCCH is provided for a random access response, random access-RNTI (RA-RNTI) may be masked with CRC.

Figure 5:
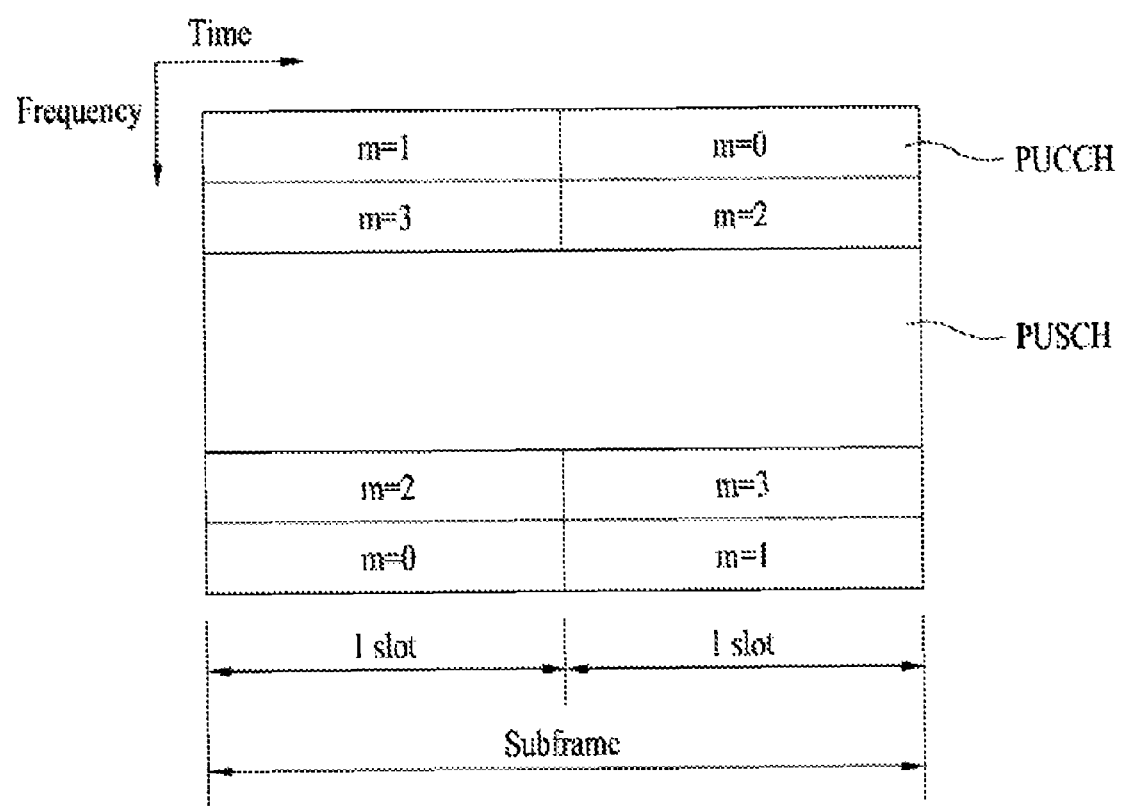
FIG. 5 illustrates an uplink subframe structure.

FIG. 5 is a diagram showing the structure of an uplink subframe used in LTE.

Referring to FIG. 5, the UL subframe includes a plurality of slots (e.g., 2 slots). Each slot may include different numbers of SC-FDMA symbols according to CP length. The UL subframe is divided into a data region and a control region in a frequency domain. The data region includes a PUCCH and transmits a data signal such as a voice signal or the like. The control region includes a PUSCH, and transmits Uplink Control Information (UCI). PUCCH includes a pair of RBs (hereinafter referred to as an RB pair) located at both ends of the data region on a frequency axis, and is hopped using a slot as a boundary.

PUCCH may be used to transmit the following control information, i.e., Scheduling Request (SR), HARQ ACK/NACK, and a Channel Quality Indicator (CQI), and a detailed description thereof will hereinafter be described.

Scheduling Request (SR): Scheduling request (SR) is used for requesting UL-SCH resources, and is transmitted using an On-Off Keying (OOK) scheme.

HARQ ACK/NACK: HARQ ACK/NACK is a response signal to an uplink (UL) data packet on a PDSCH. The HARQ ACK/NACK indicates whether or not a DL data packet has been successfully received. ACK/NACK of 1 bit is transmitted as a response to a single DL codeword, and ACK/NACK of 2 bits is transmitted as a response to two DL codewords.

Channel Quality Indicator (CQI): CQI is feedback information for a downlink channel. MIMO-associated feedback information includes a Rank Indicator (RI) and a Precoding Matrix Indicator (PMI). 20 bits are used per subframe.

The amount of control information (i.e., UCI), that is capable of being transmitted in a subframe by the UE, is dependent upon the number of SC-FDMAs available for UCI transmission. SC-FDMAs available in UCI transmission indicate the remaining SC-FDMA symbols other than SC-FDMA symbols that are used for Reference Signal (RS) transmission in a subframe. In the case of a subframe in which a Sounding Reference Signal (SRS) is established, the last SC-FDMA symbol of the subframe is also excluded. The Reference Signal (RS) is used for coherent detection of a PUCCH. PUCCH supports 7 formats according to transmission information.

Table 1 shows the mapping relationship between PUCCH format and UCI for use in LTE.

TABLE 1

| PUCCH format | Uplink control information (UCI) |
| --- | --- |
| Format 1 | Scheduling request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

Figure 6:
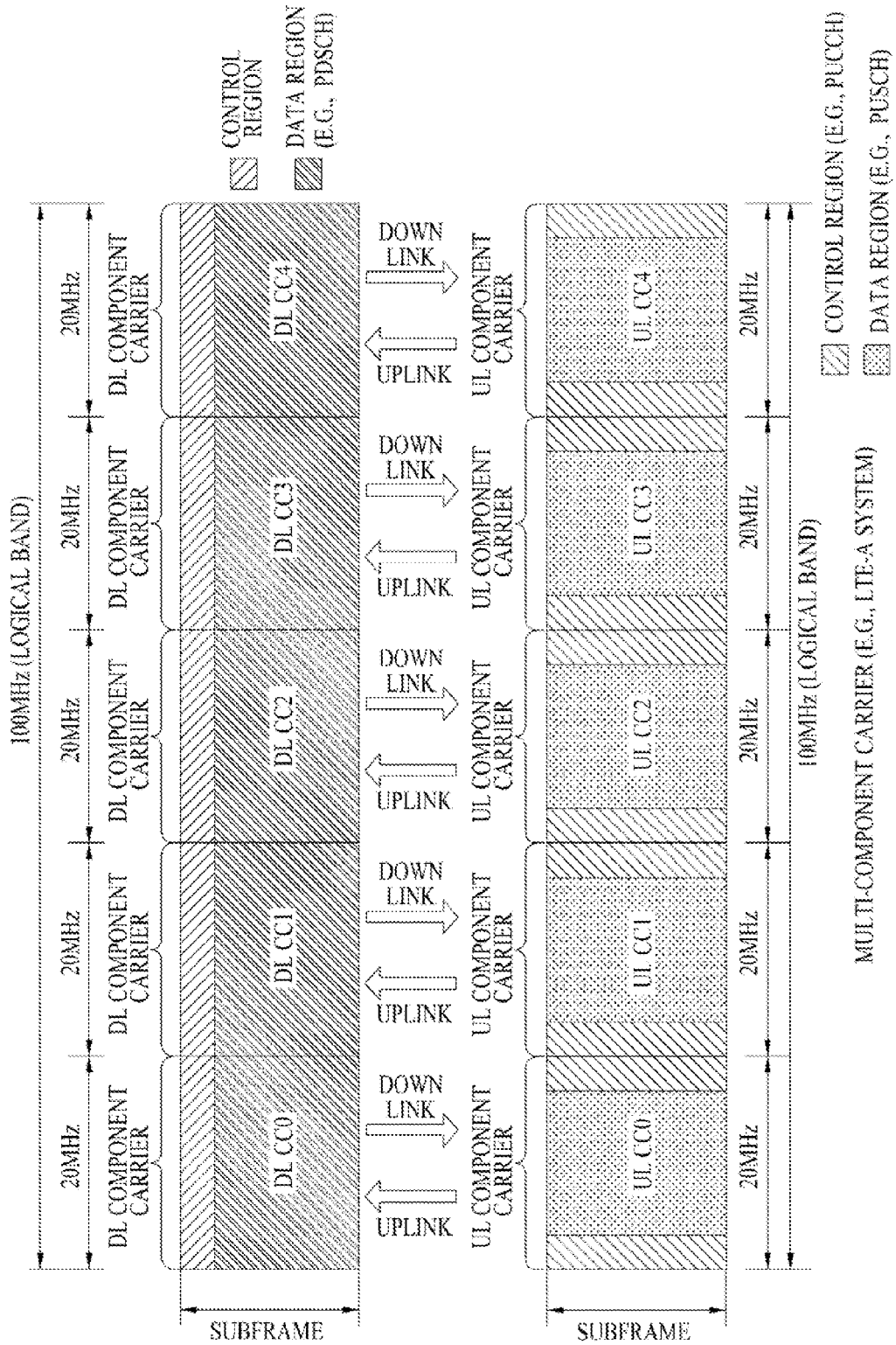
FIG. 6 exemplarily shows a carrier aggregation (CA) communication system.

FIG. 6 exemplarily shows a carrier aggregation (CA) communication system. The LTE-A system is designed to use a carrier aggregation or bandwidth aggregation technique using a plurality of UL/DL frequency blocks so as to use a wider frequency band. Each frequency block is transmitted using a component carrier (CC). The CC may be regarded as a carrier frequency (or center carrier, center frequency) for the frequency block.

Referring to FIG. 6, a plurality of UL/DL CCs can be aggregated to support a wider UL/DL bandwidth. The CCs may be contiguous or non-contiguous in the frequency domain. Bandwidths of the CCs can be independently determined Asymmetrical CA in which the number of UL CCs is different from the number of DL CCs can be implemented. For example, when there are two DL CCs and one UL CC, two DL CCs may correspond to on UL CC. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

LTE-A uses the concept of a cell so as to manage radio resources. The cell is defined as a combination of DL resources and UL resources. Here, the UL resources are not an essential part. Accordingly, the cell can be configured with DL resources only, or DL resources and UL resources. When CA is supported, the linkage between a carrier frequency (or DL CC) of a DL resource and a carrier frequency (or UL CC) of a UL resource can be designated by system information. A cell operating at a primary frequency (or PCC) can be referred to as a Primary Cell (PCell) and a cell operating at a secondary frequency (or SCC) can be referred to as a Secondary Cell (SCell). The PCell is used for a UE to perform an initial connection establishment procedure or a connection re-establishment procedure. The PCell may refer to a cell designated during a handover procedure. The SCell can be configured after RRC connection is established and used to provide additional radio resources. The PCell and the SCell can be called a serving cell. Accordingly, for a UE that does not support CA while in an RRC_connected state, only one serving cell configured with a PCell exists. Conversely, for a UE that is in an RRC_Connected state and supports CA, one or more serving cells exist, and the entire serving cells include a PCell and entire SCells. For CA, a network can configure one or more SCells for a UE that supports CA in addition to a PCell initially configured during a connection establishment procedure after an initial security activation procedure.

When cross-carrier scheduling (or cross-CC scheduling) is applied, a PDCCH for DL allocation can be transmitted through DL CC#0 and a PDSCH corresponding thereto can be transmitted through DL CC#2. For cross-CC scheduling, introduction of a Carrier Indicator Field (CIF) may be considered. The presence or absence of a CIF in a PDCCH can be set semi-statically and UE-specifically (or UE-group-specifically) according to higher layer signaling (e.g. RRC signaling). The base line of PDCCH transmission is summarized as follows.

CIF disabled: PDCCH on a DL CC allocates a PDSCH resource on the same DL CC or allocates a PUSCH resource on a linked UL CC.

CIF enabled: PDCCH on a DL CC can allocate a PDSCH or a PUSCH on a specific UL/DL CC from among a plurality of aggregated DL/UL CCs using the CIF.

When a CIF is present, a BS can allocate a PDCCH monitoring DL CC set in order to reduce BD complexity of a UE. The PDCCH monitoring DL CC set includes one or more DL CCs as part of aggregated DL CCs, and the UE detects/decodes a PDCCH only on DL CCs corresponding to the DL CC set. That is, if the BS schedules PDSCH/PUSCH for the UE, the PDCCH is transmitted only through a PDCCH monitoring DL CC set. The PDCCH monitoring DL CC set can be determined UE-specifically, UE-group-specifically or cell-specifically. The term "PDCCH monitoring DL CC" can be replaced by equivalent terms "monitoring carrier", "monitoring cell", etc. In addition, the term "aggregated CC" for a UE can be replaced by terms "serving CC", "serving carrier", "serving cell", etc.

Figure 7:
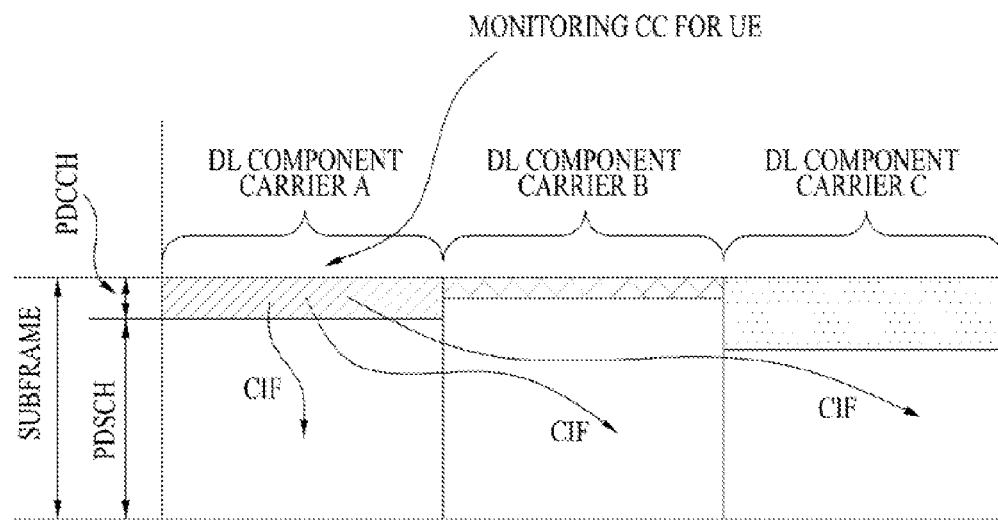
FIG. 7 exemplarily shows cross-carrier scheduling.

FIG. 7 illustrates scheduling when a plurality of carriers is aggregated. It is assumed that 3 DL CCs are aggregated and DL CC A is set to a PDCCH monitoring DL CC. DL CC A, DL CC B and DL CC C can be called serving CCs, serving carriers, serving cells, etc. When CIF is disabled, a DL CC can transmit only a PDCCH that schedules a PDSCH corresponding to the DL CC without a CIF. When the CIF is enabled according to UE-specific (or UE-group-specific or cell-specific) higher layer signaling, DL CC A (monitoring DL CC) can transmit not only a PDCCH that schedules the PDSCH corresponding to the DL CC A but also PDCCHs that schedule PDSCHs of other DL CCs. In this case, DL CC B and DL CC C that are not set to a PDCCH monitoring DL CCs do not deliver PDCCHs.

LTE-A considers transmission of a plurality of ACK/NACK information/signals with respect to a plurality of PDSCHs, which are transmitted through a plurality of DL CCs, through a specific UL CC. To achieve this, it can be considered to joint-code (Reed-Muller code, Tail-biting convolutional code, etc.) a plurality of ACK/NACKs and transmit a plurality of ACK/NACK information/signals using PUCCH format 2, or a new PUCCH format (referred to as PUCCH format 3), distinguished from ACK/NACK transmission using PUCCH format 1a/1b in the legacy LTE system. The PUCCH format 3 is a block-spreading based PUCCH format. For example, PUCCH format 3 may be used to transmit ACK/NACK, CSI (e.g. CQI, PMI, RI, PTI, etc.), SR, or two or more thereof.

Figure 8:
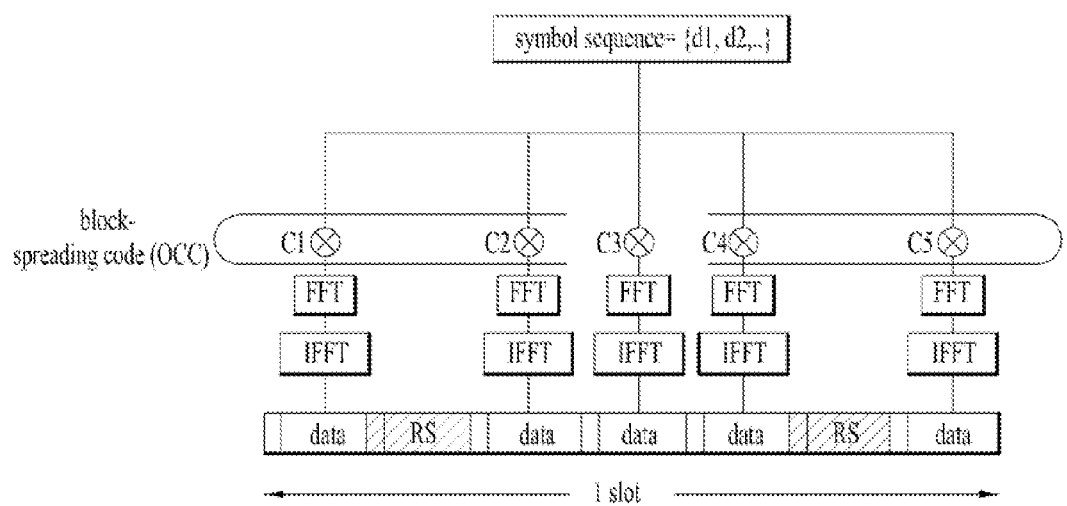
FIGS. 8 and 9 exemplarily show PUCCH formats.

FIG. 8 illustrates a block-spreading based PUCCH format 3 at a slot level. In the block-spreading based PUCCH format 3, one symbol sequence is transmitted over the frequency domain and UE multiplexing is performed using Orthogonal Cover Code (OCC) based time-domain spreading. That is, the symbol sequence is time-domain-spread using the OCC and transmitted. Control signals of a plurality of UEs can be multiplexed on the same RB using the OCC.

Figure 10:
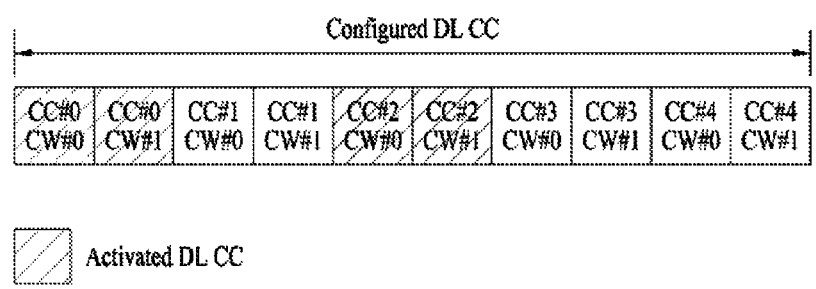
FIG. 10 exemplarily shows a method for transmitting ACK/NACK according to one embodiment of the present invention.

Referring to FIG. 8, 5 SC-FDMA symbols (i.e., UCI data part) are generated from one symbol sequence $\{d1, d2, \ldots\}$ using a length-5 (Spreading Factor (SF)=5) OCC (C1, C2, C3, C4, C5). The symbol sequence $\{d1, d2, \ldots\}$ may be a modulation symbol sequence or a codeword bit sequence. When the symbol sequence $\{d1, d2, \ldots\}$ corresponds to the codeword bit sequence, the block diagram of FIG. 10 further includes a modulation block. In FIG. 10, while 2 RS symbols (i.e., RSs) are used per slot, it is possible to consider various applications including a scheme of using an RS part composed of 3 RS symbols and a UCI data part configured using an OCC with SF=4. Here, an RS symbol may be generated from a CAZAC sequence having a specific cyclic shift (CS). An RS may be transmitted in such manner that a specific OCC is applied to (multiplied by) a plurality of RS symbols in the time domain. Block-spread UCI is subjected to Fast Fourier Transform (FFT) and Inverse FFT (IFFT) for each SC-FDMA symbol and transmitted to a network. That is, the block-spreading scheme modulates control information using SC-FDMA, distinguished from PUCCH format 1 or 2a/2b of LTE.

Figure 9:
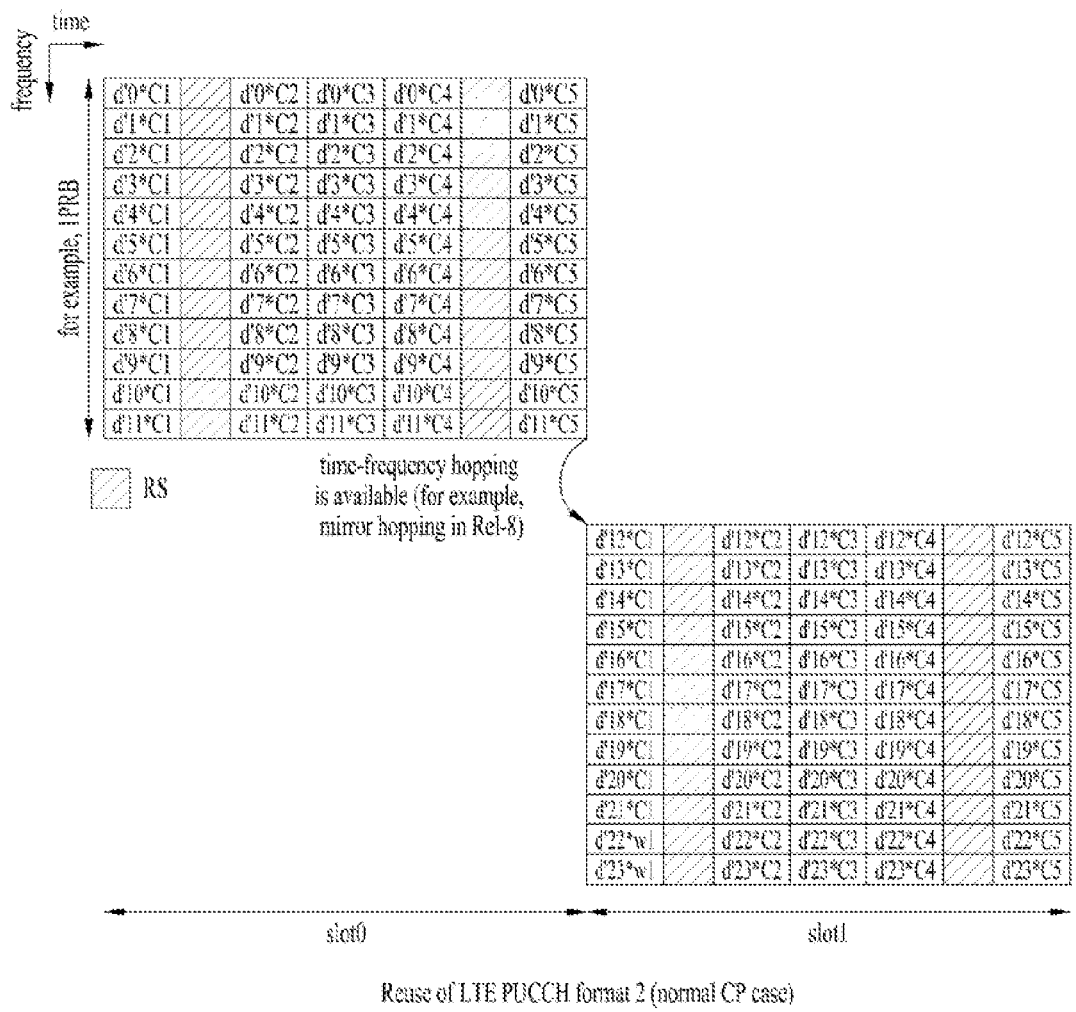

FIG. 9 exemplarily illustrates PUCCH format 3 at a subframe level.

Referring to FIG. 9, in slot 0, symbol sequence $\{d'0, d'1, \ldots, d'11\}$ is mapped to a subcarrier of one SC-FDMA symbol and mapped to 5 SC-FDMA symbols according to block spreading using OCC C1 to C5. Similarly, in slot 1, a symbol sequence $\{d'12, d'13, \ldots, d'23\}$ is mapped to a subcarrier of one SC-FDMA symbol and mapped to 5 SC-FDMA symbols according to block-spreading using ODD C1 to C5. Here, symbol sequences $\{d'0, d'1, \ldots, d'11\}$ and $\{d'12, d'13, \ldots, d'23\}$ in slots 0 and 1 represent symbol sequence $\{d1, d2, \ldots\}$, shown in FIG. 9, which has been subjected to FFT or FFT/IFFT. When symbol sequence $\{d'0, d'1, \ldots, d'11\}$ or $\{d'12, d'13, \ldots, d'23\}$ corresponds to symbol sequence $\{d1, d2, \ldots\}$ which has been subjected to FFT, IFFT is additionally applied to symbol sequence $\{d'12, d'13, \ldots, d'23\}$ or $\{d'12, d'13, \ldots, d'23\}$ in order to generate SC-FDMA symbols. The entire symbol sequence $\{d'0, d'1, \ldots, d'23\}$ is generated by joint-coding one or more pieces of UCI, and the first half $\{d'0, d'1, \ldots, d'11\}$ is transmitted through slot 0 and the remaining $\{d'12, d'13, \ldots, d'23\}$ is transmitted through slot 1. The OCC may be changed based on slot and UCI data may be scrambled for each SC-FDMA symbol.

Resources for PUCCH format 3 may be explicitly given. In more detail, a PUCCH resource set is configured by a higher layer (e.g., RRC), and PUCCH resources to be actually used may be indicated by an ACK/NACK Resource Indicator (ARI) of the PDCCH.

Table 2 explicitly shows PUCCH resources for HARQ-ACK.

TABLE 2

| Value of HARQ-ACK resource for PUCCH (ARI) | $n_{PUCCH}$ |
|---|---|
| 00 | First PUCCH resource value configured by higher layer |
| 01 | Second PUCCH resource value configured by higher layer |
| 10 | Third PUCCH resource value configured by higher layer |
| 11 | Fourth PUCCH resource value configured by higher layer |

ARI represents an ACK/NACK resource indicator. In Table 2, the higher layer may include an RRC layer and an ARI value may be indicated by a PDCCH carrying a DL grant. For example, the ARI value may be designated using an SCell PDCCH and/or a Transmit Power Control (TPC) field of one or more PCell PDCCHs that do not correspond to a DAI initial value.

If the UE aggregates a plurality of DL/UL CCs, it may perform CC activation/deactivation to reduce UE power consumption. That is, CC (for example, CC for receiving a PDSCH or receiving a PUSCH) capable of being used by the UE may be established through signaling. CC activation/deactivation may be established by L1/L2 signaling (e.g., MAC signaling). For example, the UE need not access all the configured DL CCs during DL data reception, receives DL data only in the activated DL CC, resulting in reduction of UE power consumption. In this case, a set of configured CCs (hereinafter referred to as a configured CC set) may indicate a set of CCs, each of which can be used as a higher layer signal (e.g., RRC). The activated CC set may be identical or smaller in size than the configured CC set. That is, the activated CC set is a subset of the configured CC set. The CC set may be a DL CC set, a UL CC set, or a combination of the DL CC set and the UL CC set.

Embodiment

A method for efficiently transmitting uplink control information (UCI) [preferably, ACK/NACK (also called HARQ-ACK)] using PUCCH format 3 (or a new PUCCH format) when multiple CCs (that are equivalent to carrier, carrier resource, frequency resource, cell, and the like) are aggregated in a TDD system, and a resource allocation method for the same will hereinafter be described in detail.

For convenience of description, if CC is set to a non-MIMO mode, it is assumed that a maximum of one transport block (TB) (where TB is equivalent to a codeword) can be transmitted at subframe k of the corresponding CC. If CC is set to a MIMO mode, it is assumed that a maximum of m TBs (for example, two TBs or two codewords) can be transmitted at the subframe k of the corresponding CC. Information as to whether CC is set to the MIMO mode can be recognized using a transmission mode established by a higher layer. It is assumed that the number of ACK/NACK signals (i.e., ACK/NACK bits or HARQ-ARQ bits) of the corresponding CC is set to 1 (non-MIMO) or m (MIMO) according to a transmission mode established for the corresponding CC, irrespective of the number of actually transmitted TBs (or codewords).

Terms for use in the embodiments of the present invention will hereinafter be described in detail.

HARQ-ACK: HARQ-ACK indicates a received response to DL transmission (e.g., PDSCH or SPS release PDCCH). That is, HARQ-ACK indicates ACK/NACK/DTX response (simply, ACK/NACK response). The ACK/NACK/DTX response indicates ACK, NACK, DTX or NACK/DTX. ACK may indicate the success of PUSCH decoding, and NACK may indicate a failure in PDSCH decoding. HARQ-ACK for a specific CC or HARQ-ACK of a specific CC indicates ACK/NACK response to a DL signal (e.g., PDSCH) related to the corresponding CC. For example, the DL signal may be scheduled to the corresponding CC). PDSCH may be replaced with a transport block (TB) or a codeword.

PUCCH index: PUCCH index corresponds to a PUCCH resource. For example, the term "PUCCH index" may indicate a PUCCH resource index. PUCCH resource index may be mapped to at least one of orthogonal cover (OC), cyclic shift (CS), and PRB.

ACK/NACK Resource Indicator (ARI): ARI is used to indicate a PUCCH resource. For example, ARI (configured by a higher layer) may be used to indicate a resource modification value (e.g., offset) for a specific PUCCH resource (group). In another example, ARI may also be used to indicate a specific PUCCH resource (group) index within a PUCCH resource (group) set (configured by a higher layer). ARI may be contained in a Transmit Power Control (TPC) field of a PDCCH corresponding to a PDSCH on an SCC. PUCCH power control may be carried out through a TPC field contained in a PDCCH (i.e., PDCCH corresponding to a PDSCH on a PCC) that schedules a PCC. In addition, ARI may have an initial value of a downlink assignment index (DAI), and may be contained in a TPC field of the remaining PDCCHs other than a PDCCH scheduling a specific cell (e.g., PCell). ARI may be used interchangeably with a HARQ-ACK resource indication value.

Downlink Assignment Index (DAI): DAI may be used for a TDD system. DAI may be contained in a DCI transmitted through a PDCCH. DAI may indicate an order value or counter value of a PDCCH. For convenience of description, DAI of a DL grant PDCCH is referred to as DL DAI, and DAI of a UL grant PDCCH is referred to as UL DAI.

PUCCH format 3 may be used to carry ACK/NACK for at least one PDCCH and/or at least one PDSCH received in a plurality of DL CCs. The following method for constructing ACK/NACK payload for PUCCH format 3 may be considered.

Method 1: Payload based on DL CC in which PDSCH is received.

UE may transmit ACK/NACK by constructing a payload sequence appropriate for the actually received PDSCH. For example, it is assumed that the UE aggregates 5 DL CCs, all DL CCs are configured in a MIMO mode, and a maximum of two codewords can be received per CC. If the UE receives MIMO data using only two DL CCs at a certain time (e.g., subframe), payload composed of a total of 4 bits is configured such that ACK/NACK can be transmitted.

Method 2: Payload based on configured DL CC

UE can transmit ACK/NACK by constructing a payload sequence appropriate for all the configured DL CCs. For example, it is assumed that the UE aggregates 5 DL CCs, all the DL CCs are composed in a MIMO mode, and a maximum of two codewords can be received per CC. If the UE receives data using only two DL CCs at a certain time (e.g., subframe), a payload sequence composed of a total of 10 bits (5 DL CCs×2 CWs) is configured such that ACK/NACK can be transmitted.

In case of Method 1, if the UE does not detect a PDCCH configured to schedule a PDSCH (i.e., PDCCH DTX), ACK/NACK payload predicted by the BS is different from ACK/NACK payload transmitted from the UE. Therefore, there is a high possibility of the BS failing to detect ACK/NACK.

In case of Method 2, since the UE transmits ACK/NACK in response to a maximum payload size, misalignment of ACK/NACK payload (i.e., payload size, ACK/NACK location, etc.) between the UE and the BS does not occur.

Embodiment 1

If PDCCH DTX is considered in Method 2, the UE has to transmit ACK/NACK with power at which the BS can decode a maximum of payloads. That is, although the UE receives a PDSCH through two DL CCs, the UE may recognize that PDCCH DTX has occurred in the remaining three DL CCs. Therefore, the UE must transmit ACK/NACK with power at which the BS can decode all of 5 DL CCs. In this case, ACK/NACK (bits) for 3 DL CCs in which the UE fails to detect a PDCCH (i.e., PDCCH DTX) may be set to NACK (or NACK/DTX coupling). Therefore, in case of Method 2, there may occur unexpected UE problems caused by the UE that allocates excessive or unnecessary power for ACK/NACK transmission.

Therefore, a first embodiment (Embodiment 1) proposes a method for adjusting ACK/NACK payload according to the number of configured DL CCs, and a method for adjusting transmission (Tx) power for PUCCH format 3 according to the number of activated DL CCs.

FIG. 10 exemplarily shows a method for transmitting ACK/NACK according to one embodiment of the present invention. As can be seen from FIG. 5, it is assumed that the UE configures 5 MIMO DL CCs (DL CC#0 to DL CC #4) and only two DL CCs (CC#0 and CC#2) are activated.

Referring to FIG. 10, since 5 DL CCs are configured and all DL CCs are established in a transmission mode supporting transmission of two transport blocks (TBs), ACK/NACK payload composed of 10 bits (5 DL CCs×2 bits) (BPSK assumption) is configured. When constructing ACK/NACK payload, actual transmission of a DL signal (e.g., a PDSCH or a PDCCH indicating SPS release) is not considered in the corresponding DL CC. The ACK/NACK payload is composed of a plurality of ACK/NACK parts configured per DL CC, and the ACK/NACK parts are sequentially concatenated according to CC index (or cell index). In more detail, HARQ-ACK feedback bits for the c-th DL CC (or serving cell) are defined as $o_{c,0}^{ACK}, o_{c,o_c}^{ACK} ACK_{-1}$ (where c≥0). $o_c^{ACK}$ is the number (i.e., size) of HARQ-ACK payload bits for the c-th DL CCs. For the c-th DL CC, assuming that a transmission (Tx) mode for supporting transmission of a single TB may be established and spatial bundling is applied, $o_c^{ACK}=1$ is given. In contrast, for the c-th DL CC, assuming that a transmission (Tx) mode supporting transmission of multiple TBs (e.g., 2 TBs) is established and spatial bundling is not applied, $o_c^{ACK}=2$ may be given. $o_{c,0}^{ACK}$ may indicate HARQ-ACK for CW 0, and $o_{c,1}^{ACK}$ may indicate HARQ-ACK for CW 1.

On the other hand, DL CCs capable of actually receiving PDCCH/PDSCH are DL CC#0 and DL CC#2 corresponding to active CCs, such that bits used for ACK/NACK transmission are bit #0, bit #1, bit #4, and bit #5. Assuming that the UE has accurately received a DL CC active signal, the BS has already recognized specific information (apriori information) indicating that ACK/NACK will not be transmitted to the deactivated DL CC, such that the BS may attempt to detect ACK/NACK only for a total of 2 DL CCs using the specific information. Therefore, although the UE aggregates a total of 5 DL CCs, the UE allocates only power through which only ACK/NACK for the activated DL CCs (e.g., 2 DL CCs) can be correctly transmitted, such that the ACK/NACK signals can be transmitted with the power.

In more detail, UE transmission power $P_{PUCCH}(i)$ for transmitting a PUCCH at a serving cell c (equivalent to UL CC) and a subframe (i) is represented by the following equation 1.

$$P_{PUCCH}(i) = \min\left\{\begin{array}{c} P_{CMAX,c}(i), \\ P_{0\_PUCCH} + PL_C + h(\cdot) + \\ \Delta_{F\_PUCCH}(F) + \Delta_{TxD}(F') + g(i) \end{array}\right\} [dBm] \quad [\text{Equation 1}]$$

In Equation 1, $P_{CMAX,c}(i)$ denotes UE maximum transmission power established for the serving cell (c).

$P_{0\_PUCCH,c}(i)$ denotes a parameter composed of the sum of $P_{0\_NOMINAL\_PUCCH}$ and $P_{0\_UE\_PUCCH}$. $P_{0\_NOMINAL\_PUCCH}$ and $P_{0\_UE\_PUCCH}$ are provided from a higher layer (e.g., RRC layer).

$PL_c$ denotes a downlink path loss estimation value of the serving cell (c).

Parameters $\Delta_{F\_PUCCH}(F)$ are provided from a higher layer. Each value $\Delta_{F\_PUCCH}(F)$ may indicate a value corresponding to the corresponding PUCCH format compared with PUCCH format 1a.

If the UE is configured to transmit a PUCCH at two antenna ports through a higher layer, the parameter $\Delta_{TxD}(F')$ is provided by a higher layer. Otherwise, i.e., if a PUCCH is configured to be transmitted at a single antenna port, $\Delta_{TxD}(F')$ is set to zero. That is, $\Delta_{TxD}(F')$ may correspond to a power compensation value considering an antenna port transmission mode.

$h(\cdot)$ is dependent upon PUCCH format. In case of PUCCH format 3, $h(\cdot)$ is denoted by $$h(\cdot) = \frac{n_{HARQ} + n_{SR} - 1}{2}.$$

$n_{SR}$ is a power compensation value associated with SR. In more detail, $n_{SR}$ is a subframe in which the subframe (i) is established for SR transmission. If UL-SCH transmission is present in the corresponding subframe, $n_{SR}$ is set to zero 0. Otherwise, $n_{SR}$ is set to 1.

$n_{HARQ}$ is a power compensation value associated with HARQ-ACK. In more detail, $n_{HARQ}$ corresponds to the number of HARQ-ACK information bits. In accordance with this example, $n_{HARQ}$ is determined in consideration of the number of activated DL CCs. Although the scope or spirit of the value $n_{HARQ}$ for use in the present invention is not limited thereto, it should be noted that $n_{HARQ}$ may be defined as "$n_{HARQ}=(C_1+(m-1)\cdot C_2)$". In this equation, $C_1$ is a total number of activated DL CCs, and $C_2$ is the number of activated DL CCs in which a transmission mode for supporting transmission of m TBs (e.g., m=2) from among the activated DL CCs. In the example of FIG. 10, $n_{HARQ}$ is set to 4 ($n_{HARQ}=4$).

$g(i)$ is a power control adjustment state of a current PUCCH. In more detail, $g(i)$ may be denoted by $$g(i) = g(i-1) + \sum_{m=0}^{M-1} \delta_{PUCCH}(i - k_m).$$

g(0) is a first value after execution of resetting. $\delta_{PUCCH}$ is a UE-specific correction value, and may also be referred to as a TPC command. In case of PCell, $\delta_{PUCCH}$ is contained in a PDCCH including DCI formats 1A/1B/1D/1/2A/2/2B/2C. In addition, $\delta_{PUCCH}$ is joint-coded with another UE-specific PUCCH correction value on a PDCCH including DCI formats 3/3A.

Embodiment 2

If ACK/NACK payload for PUCCH format 3 is configured on the basis of the configured DL CC, a UE always transmits 2-bit ACK/NACK in association with a DL CC (MIMO DL CC) established to transmit a plurality of codewords (equivalent to TB), irrespective of the number of actually received codewords. In this case, each ACK/NACK bit indicates HARQ-ACK for first and second codewords. If the UE receives a PDSCH configured to transmit only a single codeword at the MIMO DL CC, the UE may establish HARQ-ACK for a second codeword to NACK (or NACK/DTX).

However, assuming that a UE receives a PDSCH transmitting only a single codeword at a MIMO DL CC, the UE needs to use only two ACK/NACK states from among 2-bit ACK/NACK information for the corresponding DL CC, such that two ACK/NACK states remain. Therefore, assuming that a UE receives a PDSCH transmitting only a single codeword at a MIMO DL CC, the embodiment 2 proposes a method for decoupling NACK and PDCCH DTX.

Table 3 exemplarily shows a method for constructing ACK/NACK bits according to one embodiment of the present invention. Table 3 exemplarily shows the relationship between HARQ-ACK and bit values of ACK/NACK payload, but it should be noted that the relationship between HARQ-ACK and bit values of ACK/NACK payload can be modified in various ways.

TABLE 3

| ACK/NACK payload | HARQ-ACK(s) Single codeword | HARQ-ACK(s) Two codewords |
|---|---|---|
| 00 | DTX | DTX or NACK/NACK |
| 01 | NACK | NACK/ACK |
| 10 | ACK | ACK/NACK |
| 11 | — | ACK/ACK |

Referring to Table 3, upon receiving a plurality of codewords at a MIMO DL CC, DTX (indicating a PDCCH detection failure) and HARQ-ACKs all NACK are mapped to the same ACK/NACK payload bit values at the corresponding MIMO DL CC. On the other hand, upon receiving only one codeword at a plurality of MIMO DL CCs, DTX and HARQ-ACKs all NACK are mapped to different bit values at the corresponding MIMO DL CC. For example, if the UE receives a single codeword at a MIMO DL CC, NACK may be mapped to 01 and DTX may be mapped to 00.

Therefore, if the UE receives a single codeword at a MIMO DL CC, NACK and DTX can be separated from each other when ACK/NACK payload for the corresponding MIMO DL CC is configured. In addition, the BS may discriminate between DTX and NACK for the corresponding MIMO DL CC.

As described above, ACK/NACK payload is adjusted according to the number of configured DL CCs, and power may be generated according to the number of activated DL CCs. Therefore, upon receiving a single codeword at the activated MIMO DL CC, the UE need not allocate additional power for DTX decoupling, or need not adjust power for DTX decoupling.

Figure 11:
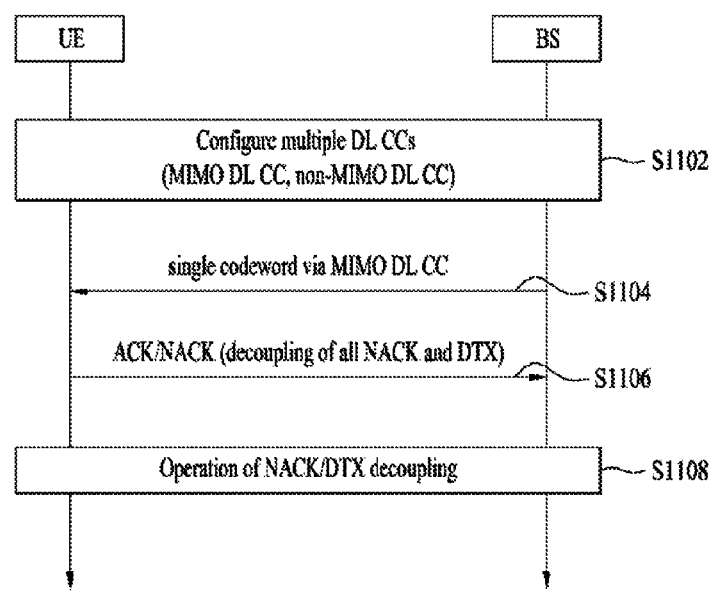
FIG. 11 is a flowchart illustrating the operations of a user equipment (UE) and a base station (BS) according to one embodiment of the present invention.

FIG. 11 is a flowchart illustrating the operations of a user equipment (UE) and a base station (BS) according to one embodiment of the present invention. In FIG. 11, it is assumed that ACK/NACK transmission is established using PUCCH format 3.

Referring to FIG. 11, the BS and the UE may configure a plurality of DL CCs (equivalent to a cell) in step S1102. Several DL CCs may include a MIMO DL CC and/or a non-MIMO DL CC. A MIMO DL CC may be a DL CC established in a transmission mode supporting a maximum of m codewords (where m=2), and non-MIMO DL CC may be a DL CC established in a transmission mode supporting transmission of a single codeword. Thereafter, the BS transmits a single codeword to the UE through the MIMO DL CC in step S1104. Step S1104 shows only parts related to the present invention. The BS may transmit a codeword to the UE in a subframe in which step S1104 is carried out.

Thereafter, the UE may feed back ACK/NACK payload for PUCCH format 3 to the BS in step S1106. The ACK/NACK payload is composed of ACK/NACK parts of individual CCs, and the ACK/NACK parts are sequentially concatenated according to cell index. In addition, the number of bits of ACK/NACK parts for each CC is given as 1 bit or m bits (e.g., m=2) according to a transmission mode established in the corresponding CC. In this case, when constructing ACK/NACK parts of a DL CC (i.e., MIMO DL CC in which a single codeword is received) in step S1104, DTX state and all NACK state are decoupled (e.g., See Table 3). On the other hand, in case of MIMO DL CC in which several codewords are received, when ACK/NACK parts for the corresponding DL CC are constructed, DTX state is coupled to NACK state.

Assuming that transmission of a single codeword is present in MIMO DL CC, each of the BS and the UE can discriminate between DTX state and all NACK state of the corresponding MIMO DL CC. Therefore, the BS and the UE may perform DTX and NACK decoupling operations in step S1108. For example, it is assumed that single codeword transmission is present in MIMO DL CC and ACK/NACK information for the corresponding DL CC indicates NACK. In accordance with the present invention, since NACK and DTX are decoupled, the ACK/NACK information means only the PDSCH decoding failure. That is, this means that a PDCCH signal has been successfully transmitted and the corresponding PDSCH signal fails to be decoded. In addition, if DTX occurs in a MIMO DL CC, it is impossible for the UE to recognize transmission of a single codeword or multiple codewords at the corresponding MIMO DL CC. However, the BS has already recognized information regarding the number of codewords transmitted to the UE, methods proposed by the present invention can be applied. That is, upon receiving ACK/NACK information indicating DTX related to MIMO DL CC from the UE, the BS may interpret the ACK/NACK information as DTX when a single codeword for the corresponding MIMO DL CC is scheduled, and the BS may interpret the ACK/NACK information as NACK/DTX when multiple codewords are scheduled in the corresponding MIMO DL CC.

In accordance with this example, the BS may recognize whether a UE transmission failure has occurred either in both PDCCH and PDSCH or in the PDSCH only. Accordingly, the BS may perform the operation for increasing transmission reliability in consideration of a physical channel in which transmission failure has occurred. For example, since DTX means a PDCCH detection failure, the BS may increase transmission power of a PDCCH so as to increase a transmission signal of a PDCCH signal. In addition, in case of DTX, it is impossible for the UE to recognize/receive a PDSCH signal. Assuming that a lost PDSCH signal is contained in a redundancy version for initial transmission of a transport block (TB), the BS can transmit the same redundancy version as in the previous transmission when retransmitting a PDSCH according to the HARQ operation, because the redundancy version for initial transmission includes system bits related to a transport block (TB). In addition, NACK denotes PDSCH decoding failure, such that the BS can increase transmission reliability by adjusting a PDSCH coding rate and a PDSCH transmission power during retransmission of a PDSCH signal. In addition, the redundancy version loaded on the retransmission PDSCH can be adjusted according to specific information indicating whether a PDSCH including NACK includes the redundancy version for initial transmission.

For convenience of description, the above-mentioned description has been exemplarily disclosed on the basis of a CA FDD system. However, it should be noted that the scope or spirit of the present invention can also be applied to the CA TDD system. In accordance with the TDD scheme, the same frequency band is divided into a DL subframe and a UL subframe in a time domain (See FIG. 2(b)). Therefore, excepting that ACK/NACK for one or more DL subframes is transmitted through the corresponding single UL subframe, the CA TDD system is basically identical to the CA FDD system. In more detail, when constructing ACK/NACK payload for PUCCH format 3, ACK/NACK parts for each DL CC may include ACK/NACK information for one or more subframes. In this case, the ACK/NACK parts for each CC are generated per subframe.

In more detail, HARQ-ACK feedback bits for the c-th DL CC (or serving cell) are defined as $o_{c,0}^{ACK}, o_{c,1}^{ACK}, \ldots o_{c,o_c^{ACK}}^{ACK}$ ACK$_{-1}$ (where c≥0). $o_c^{ACK}$ is the number (i.e., size) of bits of HARQ-ACK payload for the c-th DL CC. In association with the c-th DL CC, assuming that a transmission mode supporting transmission of a single TB is established or spatial bundling is applied, $o_c^{ACK}$ may be identical to $B_c^{DL}$ ($o_c^{ACK}=B_c^{DL}$). On the other hand, in association with the c-th DL CC, assuming that a transmission mode supporting transmission of multiple TBs (e.g., 2 TBs) is established and the spatial bundling is not applied, $o_c^{ACK}$ may be identical to $2B_c^{DL}$ ($o_c^{ACK}=2B_c^{DL}$). $B_c^{DL}$ is the number of DL subframes requiring ACK/NACK feedback at the c-th DL CC. $B_c^{DL}$ may be indicated through a UL DAI field of a UL grant PDCCH, and may be given as M. M is the number of DL subframes corresponding to UL subframes in which HARQ-ACK payload is transmitted.

If a transmission mode for supporting transmission of a single TB is established in the c-th DL CC, or if spatial bundling is applied to the c-th DL CC, the position of each ACK/NACK in per-CC HARQ-ACK payload is given as $o_{c,DAI(k)-1}^{ACK}$. DAI(k) indicates a DL DAI value of the PDCCH detected at the DL subframe (n-k). In contrast, if a transmission mode for supporting transmission of multiple TBs (e.g., two TBs) is established in the c-th DL CC and no spatial bundling is applied to the c-th DL CC, the position of each ACK/NACK in per-CC HARQ-ACK payload is denoted by $o_{c,2DAI(k)-2}^{ACK}$ and $o_{c,2DAI(k)-1}^{ACK}$. $o_{c,2DAI(k)-2}^{ACK}$ is a HARQ-ACK for Codeword 0, and $o_{c,2DAI(k)-1}^{ACK}$ is a HARQ-ACK for Codeword 1.

Figure 12:
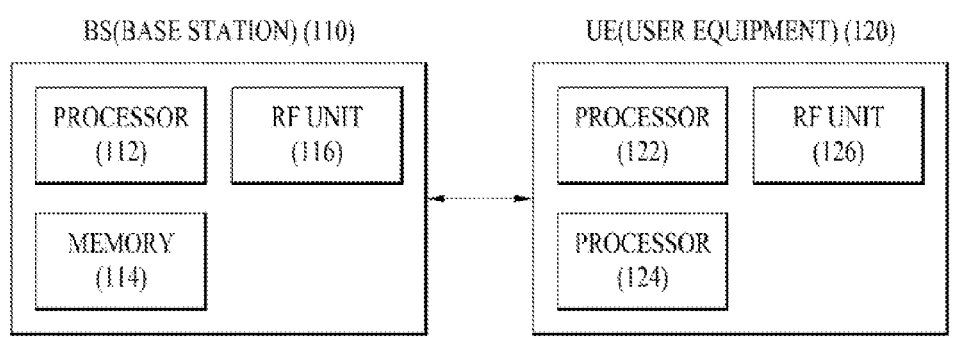
FIG. 12 is a block diagram illustrating a Base Station (BS) and a user equipment (UE) applicable to embodiments of the present invention.

FIG. 12 is a block diagram illustrating a Base Station (BS) and a user equipment (UE) applicable to embodiments of the present invention. If a relay is contained in a wireless communication system, communication in a backhaul link is achieved between a BS and a relay, and communication in an access link is achieved between a relay and a UE. Therefore, a BS or UE shown in FIG. 12 may be replaced with a relay as necessary.

Referring to FIG. 12, the wireless communication system includes a base station (BS) 110 (also denoted by 'BS') and a UE 120. The BS 110 includes a processor 112, a memory 114, and a radio frequency (RF) unit 116. The processor 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The UE 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The BS 110 and/or the UE 120 may include a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the BS may be performed by an upper node of the BS as the case may be. In other words, it will be apparent that various operations performed for communication with the UE in the network which includes a plurality of network nodes along with the BS can be performed by the BS or network nodes other than the BS. The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Exemplary embodiments of the present invention can be applied to wireless communication systems such as a UE, a relay, and a base station (BS).

The invention claimed is:

1. A method of transmitting uplink control information at a communication apparatus configured with a plurality of cells in a wireless communication system, the method comprising:
receiving at least one of one or more Physical Downlink Control Channel (PDCCH) signals and one or more Physical Downlink Shared Channel (PDSCH) signals through one or more subframes on the plurality of cells; and
generating entire received response information of the one or more PDCCH signals and the one or more PDSCH signals, wherein multiple received response information contained in the entire received response information are generated per cell and per subframe,
wherein, if there is a subframe in which a plurality of transport blocks (TBs) are received in a cell configured to support transmission of the multiple transport blocks (TBs), DTX (discontinuous transmission) state and all negative acknowledgement (NACK) state are mapped to the same bit values for the cell and the subframe, and
if there is a subframe in which only one transport block (TB) is received in a cell configured to support transmission of multiple transport blocks (TBs), DTX state and all NACK state are mapped to different bit values for the cell and the subframe.

2. The method according to claim 1, wherein the generating the received response information in a cell configured to support transmission of the multiple transport blocks (TBs) includes:
mapping a received response state of the corresponding subframe to a bit value shown in the following table:

TABLE

| Bit value | In case of subframe in which only one TB is received | In case of subframe in which 2 TBs are received |
|---|---|---|
| A | DTX | DTX or NACK/NACK |
| B | NACK | NACK/ACK |
| C | ACK | ACK/NACK |
| D | — | ACK/ACK | where each of A, B, C and D indicates different two bit values.

3. The method according to claim 1, wherein a payload size of the entire received response information is given according to the number of cells configured in the communication apparatus.

4. The method according to claim 1, further comprising:
determining a physical uplink control channel (PUCCH) transmission power for transmission of the entire received response information,
wherein the PUCCH transmission power is determined on the basis of the number of valid bits from among bits contained in the entire received response information.

5. The method according to claim 1, further comprising:
determining a physical uplink control channel (PUCCH) transmission power for transmission of the entire received response information,
wherein the PUCCH transmission power is determined on the basis of the number of activated cells from among the plurality of cells.

6. The method according to claim 1, wherein the entire received response information includes a plurality of per-cell received response information parts concatenated in increasing order of a cell index, and the each per-cell received response information part includes one or more received response information parts concatenated in order of a subframe index.

7. The method according to claim 1, further comprising:
Transmitting the entire received response information using PUCCH format 3.

8. A communication apparatus configured to transmit uplink control information in a wireless communication system including a plurality of cells, the communication apparatus comprising:
a Radio Frequency (RF) unit; and
a processor,
wherein the processor is configured to receive at least one of one or more Physical Downlink Control Channel (PDCCH) signals and one or more Physical Downlink Shared Channel (PDSCH) signals through one or more subframes in the plurality of cells, and to generate entire received response information of the one or more PDCCH signals and the one or more PDSCH signals wherein multiple received response information sets contained in the entire received response information are generated per cell and per subframe,
wherein, if there is a subframe in which a plurality of transport blocks (TBs) are received in a cell configured to support transmission of multiple transport blocks (TBs), DTX (discontinuous transmission) state and all negative acknowledgement (NACK) state are mapped to the same bit values for the cell and the subframe, and
if there is a subframe in which only one transport block (TB) is received in a cell configured to support transmission of multiple transport blocks (TBs), DTX state and all NACK state are mapped to different bit values for the cell and the subframe.

9. The communication apparatus according to claim 8, wherein the generating the received response information in a cell configured to support transmission of the multiple transport blocks (TBs) includes:

mapping a received response state of the corresponding subframe to a bit value shown in the following table:

TABLE

| Bit value | In case of subframe in which only one TB is received | In case of subframe in which 2 TBs are received |
|---|---|---|
| A | DTX | DTX or NACK/NACK |
| B | NACK | NACK/ACK |
| C | ACK | ACK/NACK |
| D | — | ACK/ACK | where each of A, B, C and D indicates different two bit values.

10. The communication apparatus according to claim 8, wherein a payload size of the entire received response information is given according to the number of cells configured in the communication apparatus.

11. The communication apparatus according to claim 8, wherein the processor determines a physical uplink control channel (PUCCH) transmission power for transmission of the entire received response information, and the PUCCH transmission power is determined on the basis of the number of valid bits from among bits contained in the entire received response.

12. The communication apparatus according to claim 8, wherein the processor determines a physical uplink control channel (PUCCH) transmission power for transmission of the entire received response information, and the PUCCH transmission power is determined on the basis of the number of activated cells from among the plurality of cells.

13. The communication apparatus according to claim 8, wherein the entire received response information includes a plurality of per-cell received response information parts concatenated in increasing order of a cell index, and the each per-cell received response information part includes one or more received response information parts concatenated in order of a subframe index.

14. The communication apparatus according to claim 8, wherein the processor is configured to transmit the entire received response information using PUCCH format 3.

* * * * *